(12) United States Patent
Coenen et al.

(10) Patent No.: US 7,104,037 B2
(45) Date of Patent: Sep. 12, 2006

(54) GEARING ARRANGEMENT

(75) Inventors: Karl Coenen, Siegburg (DE); Andreas Roth, Schirgiswalde (DE)

(73) Assignee: GKN Walterscheid GmbH, (DE)

( * ) Notice: Subject to any disclaimer, the term of this patent is extended or adjusted under 35 U.S.C. 154(b) by 568 days.

(21) Appl. No.: 10/350,724

(22) Filed: Jan. 24, 2003

(65) Prior Publication Data
US 2003/0146006 A1 Aug. 7, 2003

(30) Foreign Application Priority Data
Jan. 28, 2002 (DE) ................. 102 03 067

(51) Int. Cl.
*A01D 69/00* (2006.01)
(52) U.S. Cl. .......................................... 56/10.8
(58) Field of Classification Search ............ 56/11.6, 56/10.8, 14.7, 16.7; 474/114, 113, 116
See application file for complete search history.

(56) References Cited

U.S. PATENT DOCUMENTS

| | | | | |
|---|---|---|---|---|
| 3,061,996 A | * | 11/1962 | Ripps .................... | 56/10.7 |
| 3,483,683 A | * | 12/1969 | McCanse ................ | 56/10.7 |
| 3,908,398 A | | 9/1975 | Braunberger ........... | 180/14.1 |
| 5,203,149 A | | 4/1993 | Youngberg et al. ...... | 56/14.9 |
| 5,210,997 A | * | 5/1993 | Mountcastle, Jr. ....... | 56/15.2 |
| 5,272,859 A | * | 12/1993 | Pruitt et al. .............. | 56/15.2 |
| 6,138,445 A | | 10/2000 | Toth ....................... | 56/15.5 |
| 6,497,087 B1 | * | 12/2002 | Stiefvater et al. ........ | 56/16.6 |
| 6,578,349 B1 | * | 6/2003 | Buss et al. ............... | 56/11.6 |
| 2002/0174634 A1 | * | 11/2002 | Franet et al. ............. | 56/7 |

FOREIGN PATENT DOCUMENTS

| DE | 688596 | 2/1940 |
|---|---|---|
| DE | 41 27 517 | 2/1993 |
| DE | 44 15 205 C1 | 2/1995 |

OTHER PUBLICATIONS

Copy of Office Action from the German Patent Office dated Jul. 30, 2002.

* cited by examiner

*Primary Examiner*—Árpád Fábián Kovács
(74) *Attorney, Agent, or Firm*—Harness, Dickey & Pierce, P.L.C.

(57) ABSTRACT

A gearing arrangement for driving at least one working unit, especially a cutter arrangement, has a support unit (6) with a connection mechanism (45) coupling to a tractor (1). A gearbox housing (7) is pivotably supported around a pivoting axis (11) in the support unit (6). The gearbox housing (7) can be directly or indirectly connected to the working unit (38, 41). An input shaft (28) is pivotably supported within the gearbox housing (7) around a rotational axis (27). A connection mechanism (33) on the input shaft connects with a drive shaft (10). The input shaft (28) drives at least one output shaft (31), which is rotationally supported in the gearbox housing (7). The output shaft (31) may be connected to intermediate shaft (34, 39) to drive at least one working tool of the working unit.

14 Claims, 4 Drawing Sheets

GEARING ARRANGEMENT

CROSS-REFERENCE TO RELATED APPLICATIONS

This application claims priority to German Patent Application No. 10203067.7 filed Jan. 28, 2002, which application is herein expressly incorporated by reference.

FIELD OF THE INVENTION

The invention relates to a gearing arrangement for driving at least one working unit of an agricultural implement, especially a mower or reaper.

BACKGROUND OF THE INVENTION

In known mowers or reapers a support unit is provided which can be coupled to a tractor. A cutter arrangement is pivotably connected to the support unit. Thus, ground unevenness can be balanced out by pivoting the cutter arrangement relative to the support unit. The main gearing is arranged on the support unit and is driven by a cardan shaft. The cardan shaft is connected on one side to a power take off shaft of the tractor and to the main gearing on the other side. The main gearing output shafts, in form of cardan shafts, lead to the distributor gearings. The distributor gearings drive the individual cutting discs. Thus, the distributor gearing together with the cutter arrangement pivots relative to the support unit and to the main gearing. The pivoting movements lead to changes of the distance between the main gearing and the distributor gearings. These length changes need to be balanced by length compensation elements in the output shafts.

SUMMARY OF THE INVENTION

The present invention provides a gearing arrangement, which enables the use of output shafts, which do not include length compensation elements.

The object is solved by a gearing arrangement for driving at least one working unit of an agricultural implement, especially a mower or reaper, that includes a support unit with a connection mechanism coupled to a tractor. A gearbox housing is pivotably supported around a pivoting axis in the support unit. The gearbox housing may be directly or indirectly connected to the working unit. An input shaft is pivotably supported within the gearbox housing around a rotational axis. The input shaft has a connection mechanism that connects to a drive shaft. At least one output shaft is pivotably supported in the gearbox housing. The output shaft is coupled to and driven by the input shaft. Also, the output shaft may be connected to an intermediate shaft to drive at least one working unit.

The gearbox housing is pivotably supported in the support unit and the working unit can be connected to the gearbox housing. Accordingly, the working units and the gearbox housing pivot together. Thus, the intermediate shafts, which are connected on one side to the output shaft of the gearing arrangement and on the other side to the working units, do not have to balance out any length variations. Also, the intermediate shafts do not have any length compensation elements and have a simpler construction. Thus, the intermediate shafts do not take up any axial forces, so that smaller dimensioned intermediate shafts can be used.

The input shaft and the output shaft can be connected to each other by any gearing arrangement. They can, for example, be connected to each other by an angular gear drive arrangement or a worm gear arrangement.

The rotational axis of the input shaft and the pivoting axis can be arranged coaxial to each other. Therefore, in a pivoting movement no length variations are produced in the drive shaft. The drive shaft can be connected on the one side to a power take off shaft of a tractor and on the other side to the input shaft. The loading of a length compensation unit of the drive shaft is, therefore, remarkably reduced. This is because the length compensation unit only has to compensate for length variations when the whole gearing arrangement is lifted by a lifting device of the tractor.

The rotational axis of the input shaft and the pivoting axis can, however, also be arranged so that they intersect each other at a common intersection point. The intersection point is preferably arranged within the housing.

When the rotational axis and the pivoting axis are arranged coaxial to each other or intersect each other in a common intersection point, the bearing for the pivoting movement of the gearbox housing can be arranged around the input shaft. This achieves a compact design.

Accordingly, the gearbox housing has a first bearing projection. A bore is provided in the projection. The bore extends coaxially to the rotational axis. The input shaft is lead out of the gearbox housing of the first bore. The gearbox housing includes a second bearing projection. The first bearing projection has a first cylindrical bearing face that is arranged coaxial to the pivoting axis. The second bearing projection has a second cylindrical bearing face that is arranged coaxial to the pivoting axis. Friction bearing rings can be arranged on the cylindrical bearing faces. The friction bearing rings are arranged, respectively, within a bearing bore of the support unit.

Preferably, the intermediate shafts are connected to a drive unit to drive at least one working unit. The drive unit and the gearbox housing are at least indirectly rigidly connected to each other.

Accordingly, the gearbox housing is connected by a tube to at least one of the drive units. The intermediate shafts extend within one of the tubes and are connected to one of the drive units with respect to the drive. The intermediate shafts can be cardan shafts. The tubes can also be substituted by construction elements different from these which connect a drive unit rigidly to the gearbox housing.

The gearbox housing can, furthermore, be connected to a support, on which the drive units and the working units are mounted. Therefore, the gearbox housing, the drive units and the working units form a unit rigidly connected to each other. Together they are pivotably arranged around the pivoting axis.

Preferably one of the drive units is an angular gear drive and one of the working units is a cutter arrangement. A further drive unit is preferably a belt drive. Here, a working unit in the form of a conditioner for splitting the goods to be harvested is driven.

To limit the pivoting movement of the gearbox housing relative to the support unit, abutments are provided on the support unit.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiment(s) is merely exemplary in nature and is in no way intended to limit the invention, its application, or uses.

Figure 1:
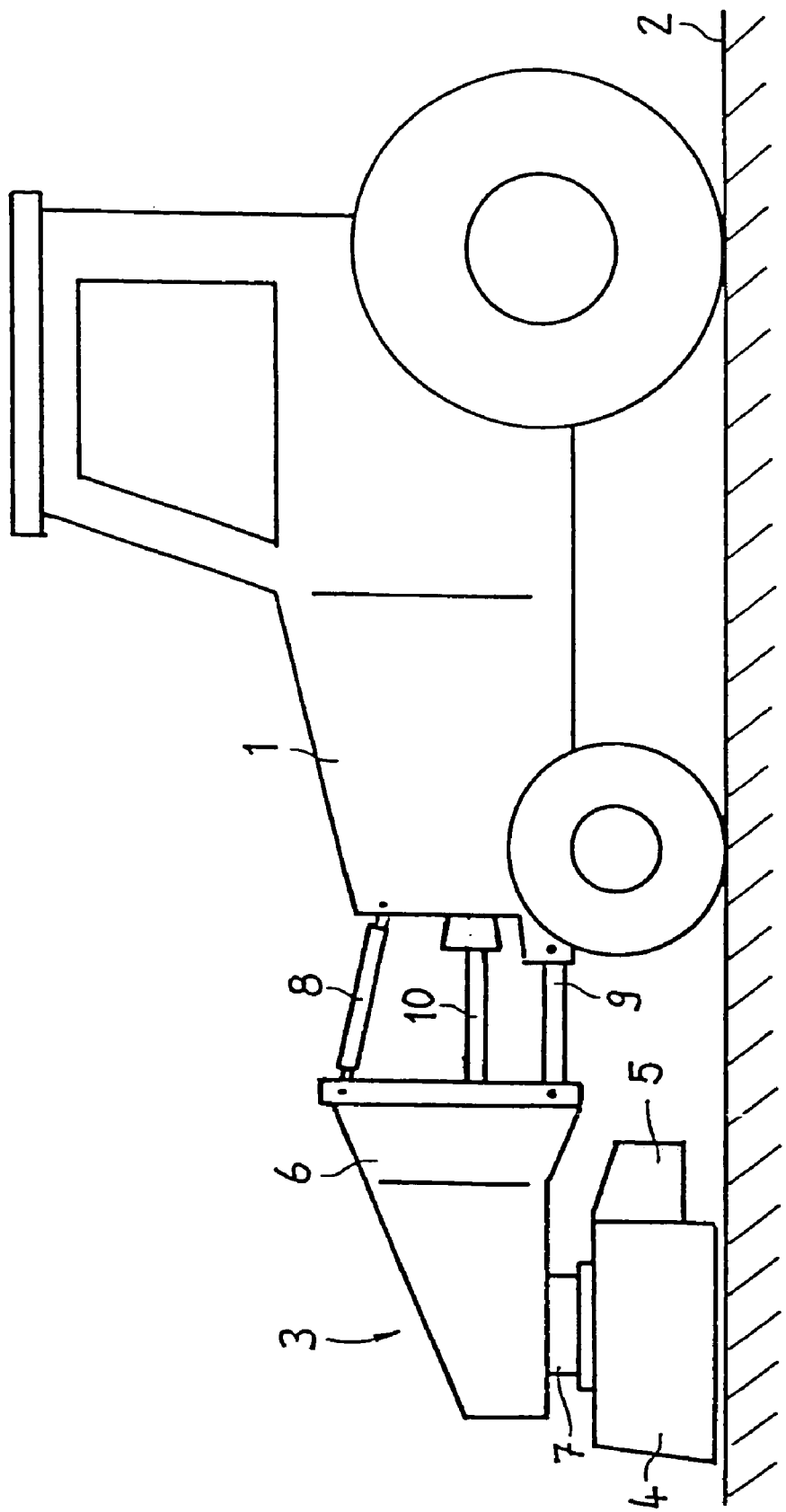
FIG. 1 is a side view of an agricultural tractor with a gearing arrangement according to the invention coupled to a three-point coupling of the tractor.

FIG. 1 shows a tractor, which is driveable on a driving plane. A gearbox arrangement 3 is mounted on the front of the tractor 1. The gearbox arrangement 3 drives a cutter arrangement 4 and a conditioner 5. The gearing arrangement includes a support unit 6 as well as a gearbox housing 7. The gearbox housing 7 is pivotably mounted relative to the support unit 6. The support unit 6 is coupled to the tractor 1 by a three-point coupling, which has an upper link 8 and a lower link 9. A drive shaft 10 is connected on one side to a power take off shaft of the tractor 1 and on the other side to the gearing arrangement 3.

Figure 2:
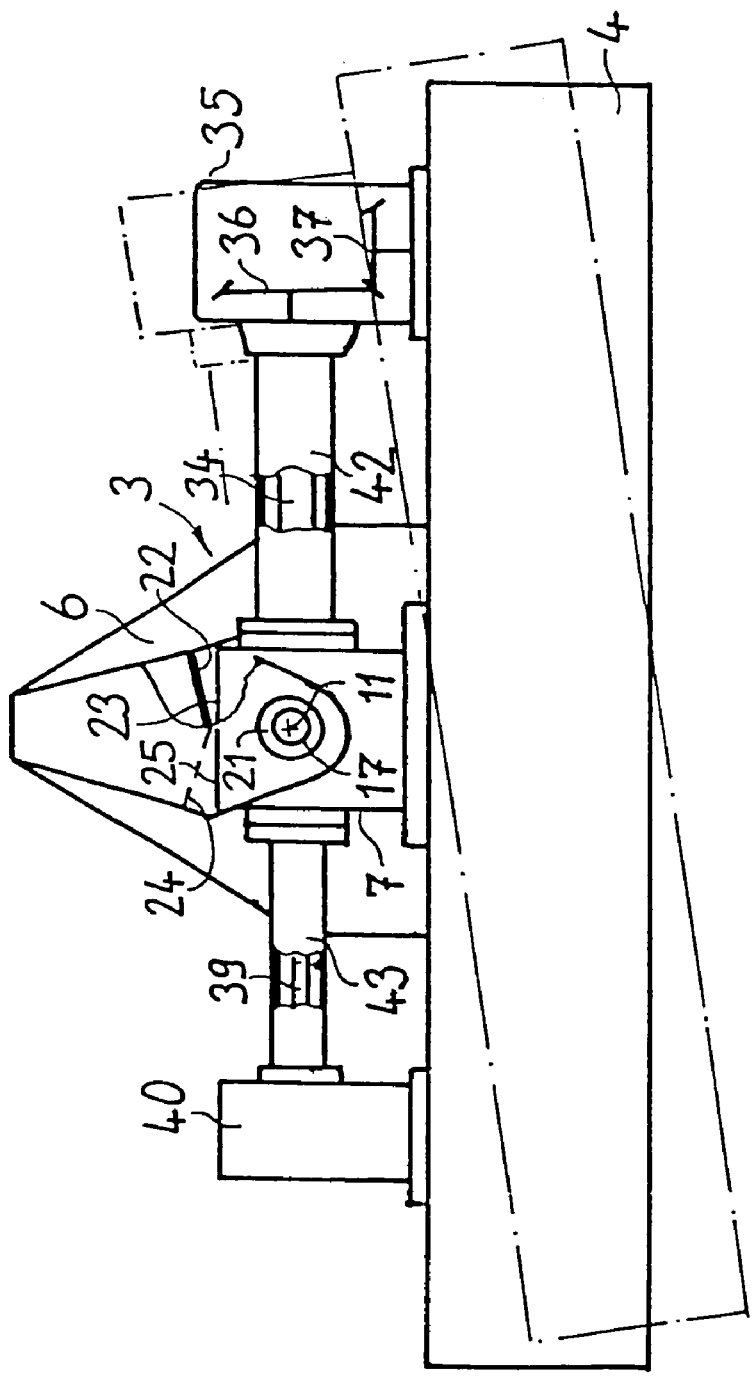
FIG. 2 is a front view of a gearing arrangement of FIG. 1.
Figure 3:
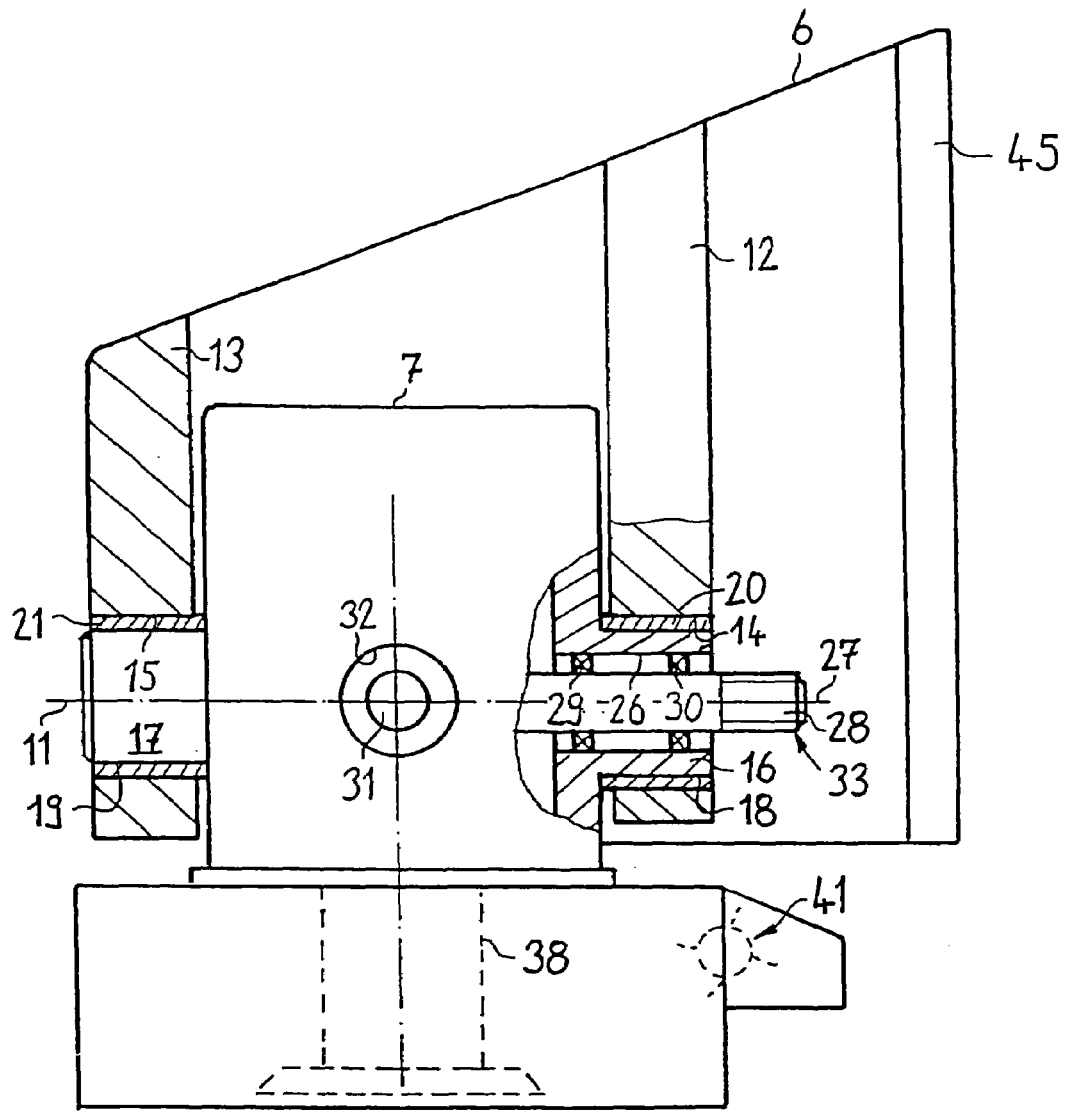
FIG. 3 is a partial sectional view through the gearing arrangement of FIG. 2.

FIG. 2 shows a front view and FIG. 3 shows a partial sectional view of the gearing arrangement of FIG. 1 and are described together below.

The support unit 6 has a connection mechanism 45 which connects the support unit to a three-point coupling of a tractor. The gearbox housing 7 is pivotably supported in the support unit 6 around a pivoting axis 11. The support unit 6 has a first support element 12 and a second support element 13. A first bearing bore 14 is provided in the first support element 12 and a second bearing bore 15 is provided in the second support element. The two bearing bores 14, 15 extend coaxially along the pivoting axis 11. The gearbox housing 7 has a first bearing projection 16 as well as a second bearing projection 17. The first bearing projection 16 has a first bearing face 18 and the second bearing projection 17 has a second bearing face 19.

The two bearing faces 18, 19 are cylindrical and are also arranged coaxial along the pivoting axis 11. The first bearing projection 16 is, via a first sliding ring 20, in sliding support with the first bearing bore 14. The second bearing projection 17 is, via a second sliding ring 21, in sliding support with the second bearing bore 15. Therefore, the gearbox housing 7 can be pivoted or rotated around the pivoting axis 11 relative to the support unit 6.

A first abutment face 22 is formed on the support unit 6. The abutment face 22 interacts with a first counter face 23 of the gearbox housing 7. The pivoting angle is limited in a first pivoting direction, as soon as the first abutment face 22 abuts the first counter face 23. A second abutment face 24 of the support unit 6 and a second counter face 25 of the gearbox housing 7 limit the pivoting angle in the other pivoting direction.

The first bearing projection 16 has a bore 26 arranged coaxial to a rotational axis 27. The rotational axis 27 in the embodiment, represented in FIG. 3, is arranged coaxial to the pivoting axis 11. An input shaft 28 is passed through the bore 26. The input shaft 28 is supported by rolling member bearings 29, 30 in the bore 26. The input shaft 28 leads into the gearbox housing 7 and is connected to a first output shaft 31 and a second output shaft. The connection, concerning the drive, may be an angular gear arrangement or a worm wheel arrangement. The first output shaft 31 is lead out of the gearbox housing 7 through bore 32. The first output shaft 31 is supported in the bore 32. On the side of the gearbox housing 7 facing away from the first output shaft 31 a second output shaft extends from the gearbox housing and is supported in the housing. The input shaft 28 has a connection mechanism 33 in the form of splines. The splines connect the input shaft 28 to a drive shaft.

The first output shaft 31 is connected to a first intermediate shaft 34. The first intermediate shaft 34 is connected to an angular gear drive 35. The angular gear drive 35 includes a first angular wheel 36, which is connected directly to the first intermediate shaft 34. The first angular wheel 36 drives a second angular wheel 37, which again, concerning the drive, is connected to cutter arrangements 38.

The second output shaft is connected to a second intermediate shaft 39. A belt drive 40 is driven by the second intermediate shaft 39. The belt drive 40 drives a conditioner 41 for splitting the cut goods.

A first tube 42 is mounted on the gearbox housing 7. The first tube 42 leads to the angular gear drive 35 and is rigidly mounted with the drive 35. The first intermediate shaft 34 is arranged within the tube 42. The intermediate shaft 34 connects, concerning driving, the angular gear drive 35 to the first output shaft 31. A second tube 43 is mounted on the gearbox housing 7. The second tube 43 leads to the belt drive 40 and is mounted with the drive belt 40. The second intermediate shaft 39 is arranged in the second tube 43. The second intermediate shaft 39 connects, concerning the drive, the second output shaft to the belt drive 40. The gearbox housing 7, the tubes 42, 43, the angular gear drive 35 and the belt drive 40 form a rigid unit, which can be pivoted around the pivoting axis 11. Therefore, no further supporting elements are necessary.

Figure 4:
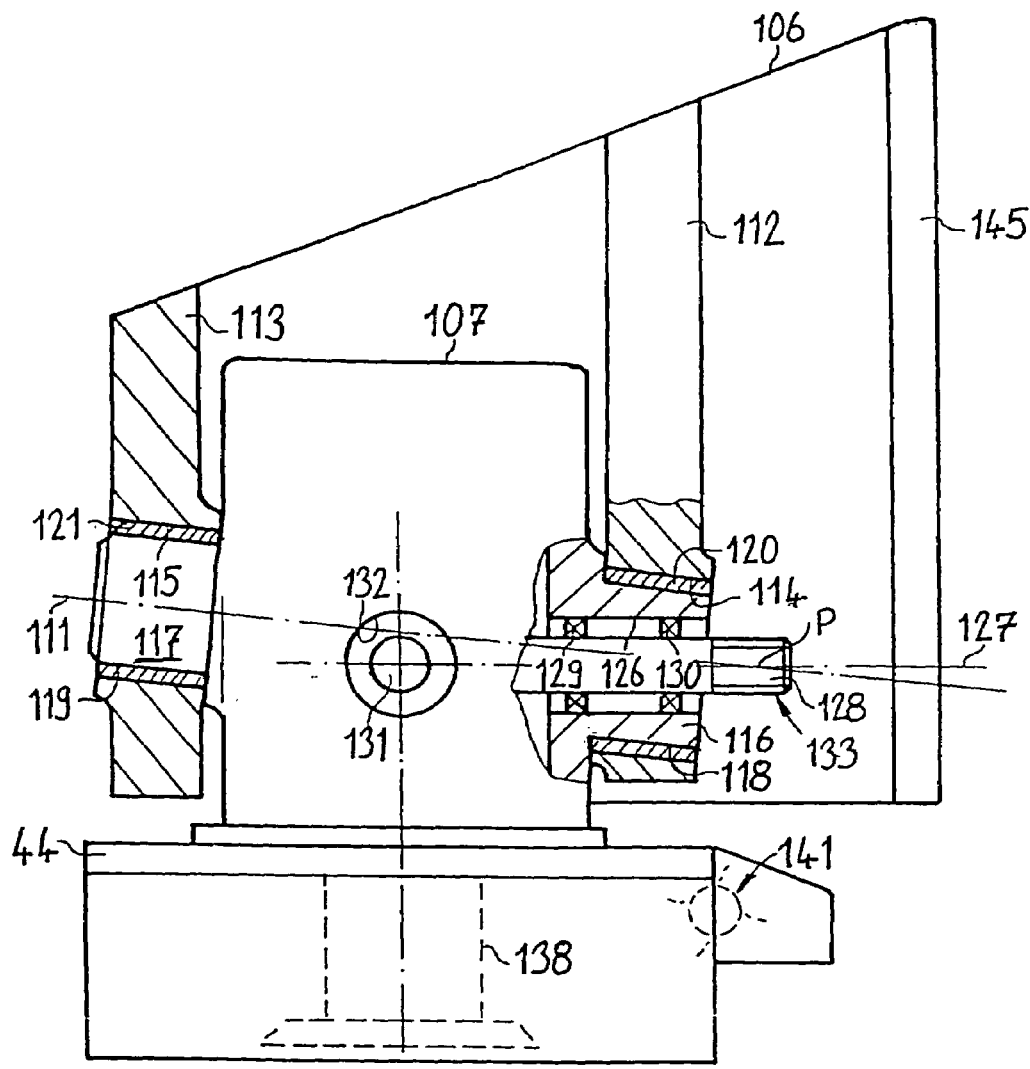
FIG. 4 is a partial sectional view through a gearing arrangement, in which the rotational axis and the pivoting axis are arranged at an angle to each other.

FIG. 4 shows a partial sectional view through a second embodiment of a gearing arrangement. Components, which correspond to components of the gearing arrangement of FIG. 3, are provided with reference numerals, which are increased by the value 100, and are described in connection with FIG. 3.

The gearbox housing 107 is pivotably supported around a pivoting axis 111 within the support unit 106. The support unit 106 is arranged at an angle to the rotational axis 127 and intersects the same in an intersection point P. For this, the bearing bores 114, 115 as well as the bearing faces 118, 119 of the bearing projections 116, 117 are arranged coaxial to the pivoting axis 111. Therefore, they are also arranged at an angle to the bore 126, in which the input shaft 128 is supported.

Furthermore, the gearbox housing 107 is connected to a plate support 44. The cutter arrangement 138 and the conditioner 141 are mounted on the plate support 44. Furthermore, further angular gear drives or belt drives can be mounted on the support 44 so that a rigid unit is achieved, including a gearbox housing 107, angular gear drives, belt drives, cutter arrangements 138 as well as conditioners 141.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A gearing arrangement for driving at least one working unit of an agricultural implement, especially a mower or reaper, comprising:
   a support unit with a connection mechanism for coupling to a tractor;
   a gearbox housing pivotally supported around a pivoting axis in the support unit and said gearbox housing connected directly or indirectly to the at least one working unit;
   an input shaft pivotally supported within the gearbox housing around a rotational axis, said input shaft having a second connection mechanism for connecting with a drive shaft; and
   at least one output shaft pivotally supported in the gearbox housing, said at least one output shaft drivingly coupled to the input shaft and connected to an intermediate shaft for driving said at least one working unit, wherein the rotational axis and the pivoting axis are arranged in the same direction such that said axes are coaxial to each other or intersect each other at a common intersection point if said axes are angled with respect to one another.

2. The gearing arrangement according to claim 1, wherein the gearbox housing has a first bearing projection, a bore provided in said first bearing projection, said bore extending coaxially to the rotational axis and said input shaft being lead out off the gearbox housing through said bore, and the gearbox housing having a second bearing projection, said first bearing projection having a first cylindrical bearing face arranged coaxial to the pivoting axis, and said second bearing projection having a second cylindrical bearing face arranged coaxial to the pivoting axis.

3. The gearing arrangement according to claim 2, wherein the gearbox housing being connected via a tube with at least one drive unit and the intermediate shaft extending within said tube and is connected with the at least one drive unit.

4. The gearing arrangement according to claim 2, wherein the gearbox housing is connected to a support, on which the at least one drive unit and the at least one working unit are mounted.

5. The gearing arrangement according to claim 2, wherein one of the drive units is an angular gear drive and one of the working units is a cutter arrangement.

6. The gearing arrangement according to claim 2, wherein one of the drive units is a belt drive and one of the working units is a conditioner.

7. The gearing arrangement according to claim 1, wherein abutment faces are provided on the support unit, said abutment faces limit the pivoting angle of the gearbox housing relative to the support unit.

8. The gearing arrangement according to claim 1, wherein the gearbox housing has a first bearing projection, a bore provided in said first bearing projection said bore extending coaxially to the rotational axis and said input shaft being lead out off the gearbox housing through said bore, and the gearbox housing having second bearing projection, said first bearing projection having a first cylindrical bearing face arranged coaxial to the pivoting axis, and said second bearing projection having a second cylindrical bearing face arranged coaxial to the pivoting axis.

9. The gearing arrangement according to claim 3, wherein the gearbox housing is connected to a support, on which the at least one drive unit and the at least one working unit are mounted.

10. The gearing arrangement according to claim 3, wherein one of the at least one drive units is an angular gear drive and one of the at least one working units is a cutter arrangement.

11. The gearing arrangement according to claim 4, wherein one of the at least one drive units is an angular gear drive and one of the at least one working units is a cutter arrangement.

12. The gearing arrangement according to claim 3, wherein one of the at least one drive units is a belt drive and one of the at least one working units is a conditioner.

13. The gearing arrangement according to claim 4, wherein one of the at least one drive units is a belt drive and one of the at least one working units is a conditioner.

14. The gearing arrangement according to claim 5, wherein one of the at least one drive units is a belt drive and one of the at least one working units is a conditioner.

* * * * *

UNITED STATES PATENT AND TRADEMARK OFFICE
CERTIFICATE OF CORRECTION

PATENT NO. : 7,104,037 B2
APPLICATION NO. : 10/350724
DATED : September 12, 2006
INVENTOR(S) : Coenen et al.

It is certified that error appears in the above-identified patent and that said Letters Patent is hereby corrected as shown below:

Title Page
Item [75] Inventors, 2nd inventor, 2nd line
"Andreas Roth, Schirgiswalde (DE)" should be --Andreas Roth, Neunkirchen (DE)--

Signed and Sealed this

Sixteenth Day of January, 2007

JON W. DUDAS
*Director of the United States Patent and Trademark Office*